United States Patent
Sano

(10) Patent No.: US 6,785,974 B2
(45) Date of Patent: Sep. 7, 2004

(54) ROTATION ANGLE DETECTING DEVICE IN WHICH A PLURALITY OF SLIT ARRAYS ARE ARRANGED ALONG THE ROTATION AXIS OF A CODE PLATE

(75) Inventor: Tadashi Sano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/341,537

(22) Filed: Jan. 13, 2003

(65) Prior Publication Data

US 2003/0167645 A1 Sep. 11, 2003

(30) Foreign Application Priority Data

Jan. 15, 2002 (JP) ........................................ 2002-006257

(51) Int. Cl.[7] ............................................... G01B 11/26
(52) U.S. Cl. ......................................... 33/1 PT; 33/707
(58) Field of Search ............................... 33/1 PT, 1 N, 33/534, 706, 707

(56) References Cited

U.S. PATENT DOCUMENTS

| | | | | |
|---|---|---|---|---|
| 4,414,754 A | * | 11/1983 | Lapeyre | ..................... 33/363 K |
| 4,449,191 A | * | 5/1984 | Mehnert | ..................... 33/1 PT |
| 6,093,928 A | * | 7/2000 | Ohtomo et al. | ................ 33/707 |
| 6,144,027 A | | 11/2000 | Weber | |
| 6,311,401 B1 | | 11/2001 | Neckel et al. | ............... 33/1 PT |
| 6,568,093 B2 | * | 5/2003 | Kogiso et al. | ............... 33/1 PT |
| 6,574,876 B2 | * | 6/2003 | Takeuchi | ..................... 33/1 PT |
| 6,577,984 B1 | * | 6/2003 | Clairet et al. | ................ 33/1 PT |

* cited by examiner

Primary Examiner—Christopher W. Fulton
(74) Attorney, Agent, or Firm—Brinks Hofer Gilson & Lione

(57) ABSTRACT

First slits constituting a first slit array are formed in a circumferential side portion of a cylindrical code plate so as to be arranged in the circumferential direction of the code plate. Second slits constituting a second slit array are also formed in the circumferential side portion. The first slit array and the second slit array are arranged along the rotation axis of the code plate. First and second detecting units are provided for the first slit array and a third detecting unit is provided for the second slit array. In the first and second detecting units, a light-emitting element and a light-receiving element are disposed so that part of the circumferential side portion is interposed in between. The positions of the light-emitting element and the light-receiving element are set identical when measured along the circumference of the code plate, and a dimension $\beta$ of the light-emitting element that is located inside the code plate is set smaller than a dimension $\gamma$ of the light-receiving element.

19 Claims, 2 Drawing Sheets

ROTATION ANGLE DETECTING DEVICE IN WHICH A PLURALITY OF SLIT ARRAYS ARE ARRANGED ALONG THE ROTATION AXIS OF A CODE PLATE

BACKGROUND OF THE INVENTION

1. Field of the Invention

The present invention relates to a rotation angle detecting device that is used for detection of a rotation angle of a rotary body provided in a vehicular apparatus, such as detection of a steering angle of a vehicle steering wheel.

2. Description of the Related Art

A rotation angle detecting device is known that is used for detection of a rotation angle of a rotary body provided in a vehicular apparatus, such as detection of a steering angle of a vehicle steering wheel. This rotation angle detecting device is provided with a disk-shaped code plate that rotates together with the rotary body and is formed with a slit array as a track for generating a signal and a detecting means for detecting a rotation angle of the rotary body based on a signal that is generated by rotation of the code plate.

In the above conventional rotation angle detecting device, the slit array is formed in the disk-shaped code plate in such a manner that slits are arranged in the circumferential direction of the code plate. The detecting means is provided with a light-emitting element that is disposed at a prescribed position and emits light toward a slit and a light-receiving element for receiving light that has been emitted by the light-emitting element and has passed through a slit.

To increase the resolution, the code plate is provided with a plurality of slit arrays such as a slit array as a incremental signal track and a slit array as an index signal track.

Incidentally, to install the conventional rotation angle detecting device in an automobile or the like, it is necessary to set the dimensions of the entire device in accordance with limitations on the installation space that are caused by layout relationships with peripheral devices and other factors. Further, to control an associated vehicular apparatus with high accuracy in accordance with the rotation angle of the rotary body, the accuracy of detection of the rotation angle of the rotary body needs to be high.

However, to give high detection accuracy to the rotation angle detecting device, the accuracy of working that relates to the shape and arrangement of slits that are provided in the disk-shaped code plate and the accuracy of working that relates to preventing the code plate from becoming eccentric should be high to a certain extent; the code plate becomes more difficult to work as its diameter becomes smaller. In particular, where the code plate is provided with a plurality of slit arrays, the diameter of the code plate tends to be large. That is, it is difficult to reduce the dimension of the rotation angle detecting device in the radial direction of the code plate.

SUMMARY OF THE INVENTION

The present invention has been made to solve the above problems, and an object of the invention is therefore to provide a rotation angle detecting device capable of increasing the resolution without increasing the diameter of a code plate.

To attain the above object, the invention provides a rotation angle detecting device comprising a cylindrical code plate that rotates as a rotary body rotates, the code plate having a circumferential side portion that is provided with a plurality of slit arrays that are arranged along a rotation axis of the code plate, each of the slit arrays having slits that are arranged in a circumferential direction of the code plate; a light-emitting portion provided at a prescribed position for each of the slit arrays, for emitting light toward a slit of the slit array; and a light-receiving portion provided for each of the slit arrays, for receiving the light that has been emitted by the light-emitting portion and has passed through the slit.

With this configuration, the dimension of the portion where the plurality of slit arrays such as a slit array as an incremental signal track and a slit array as an index signal track are formed can be included in the dimension of the code plate along its rotation axis rather than the diameter of the code plate. Therefore, high resolution can be attained without increasing the diameter of the code plate.

The above rotation angle detecting device may be such that the plurality of slit arrays are two slit arrays, and that the slits of one of the two slit arrays are cuts that are formed at one end of the circumferential side portion so as to extend along the rotation axis of the code plate, and the slits of the other slit array are cuts that are formed at the other end of the circumferential side portion so as to extend along the rotation axis of the code plate.

With this configuration, when a code plate is formed by resin molding using a molding die, a cylindrical code plate having two kinds of slit arrays can be formed without the need for using a slide core for forming slits. The structure of the molding die is simple and the number of manufacturing steps is smaller. As a result, the manufacturing cost of the rotation angle detecting device can be reduced.

In the above rotation angle detecting device, it is preferable that one of the two slit arrays be an incremental signal track and the other slit array be an index signal track. This configuration makes it possible to detect an absolute rotation angle at a high resolution using plural numbers of rotations.

The above rotation angle detecting device may be such that the cylindrical code plate further has a top planar portion, and that the cuts of the incremental signal track bridge the top planar portion and the circumferential side portion and the cuts of the index signal track are adjacent to an opening of the circumferential side portion.

With this configuration, each slit of the incremental signal track is completely closed. The code plate can be made stronger and hence its deformation due to external force or the like can be reduced. And it becomes possible to detect an absolute angle at a high resolution with high accuracy.

The first-described rotation angle detecting device may be such that at least one of the light-emitting portions be disposed inside the cylindrical code plate and at least one of the light-receiving portions be disposed outside the cylindrical code plate, and that the at least one light-receiving portion receive light that is emitted by the at least one light-emitting portion and travels somewhat upward with respect to a horizontal direction in a state that a top planar portion of the cylindrical code plate is oriented horizontally.

With this configuration, since the light-emitting portion is set lower than the light-receiving portion, the dimension of the cylindrical code plate along its rotation axis can be reduced. Therefore, the dimension of the rotation angle detecting device along the rotation axis of the code plate can be reduced.

In the above rotation angle detecting device, it is preferable that one of the two slit arrays be an incremental signal track and the other slit array be an index signal track. In addition to the above-described advantages, this configuration provides an advantage that an absolute rotation angle can be detected at a high resolution by using plural numbers of rotations.

In the above rotation angle detecting device, it is preferable that the cylindrical code plate further have a top planar portion, and that cuts as the slits of the incremental signal track bridge the top planar portion and the circumferential side portion and cuts as the slits of the index signal track be adjacent to an opening of the circumferential side portion.

With this configuration, each slit of the incremental signal track is completely closed. The code plate can be made stronger and hence its deformation due to external force or the like can be reduced. Another advantage is that an absolute angle can be detected at a high resolution with high accuracy.

BRIEF DESCRIPTION OF THE DRAWINGS

FIG. 3A is a vertical sectional view of a detecting means that is provided for a first slit array and FIG. 3B is a vertical sectional view of a detecting means that is provided for a second slit array.

DESCRIPTION OF THE PREFERRED EMBODIMENT

A rotation angle detecting device according to an embodiment of the present invention will be hereinafter described with reference to the drawings.

Figure 1:
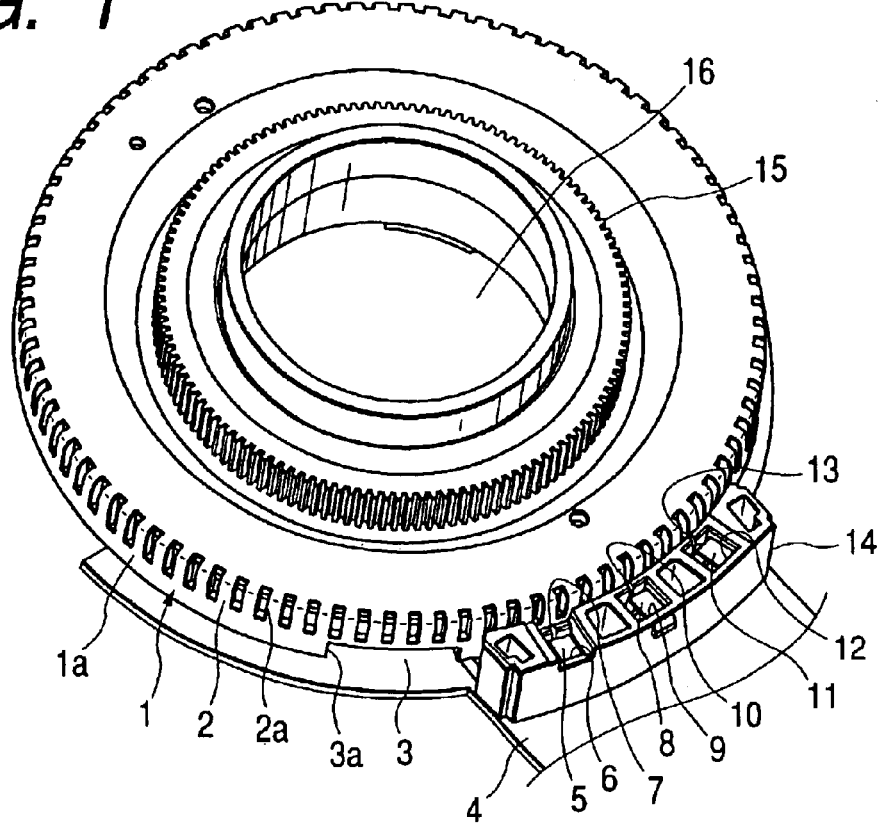
FIG. 1 is a perspective view of the rotation angle detecting device according to an embodiment of the present invention.
Figure 2:
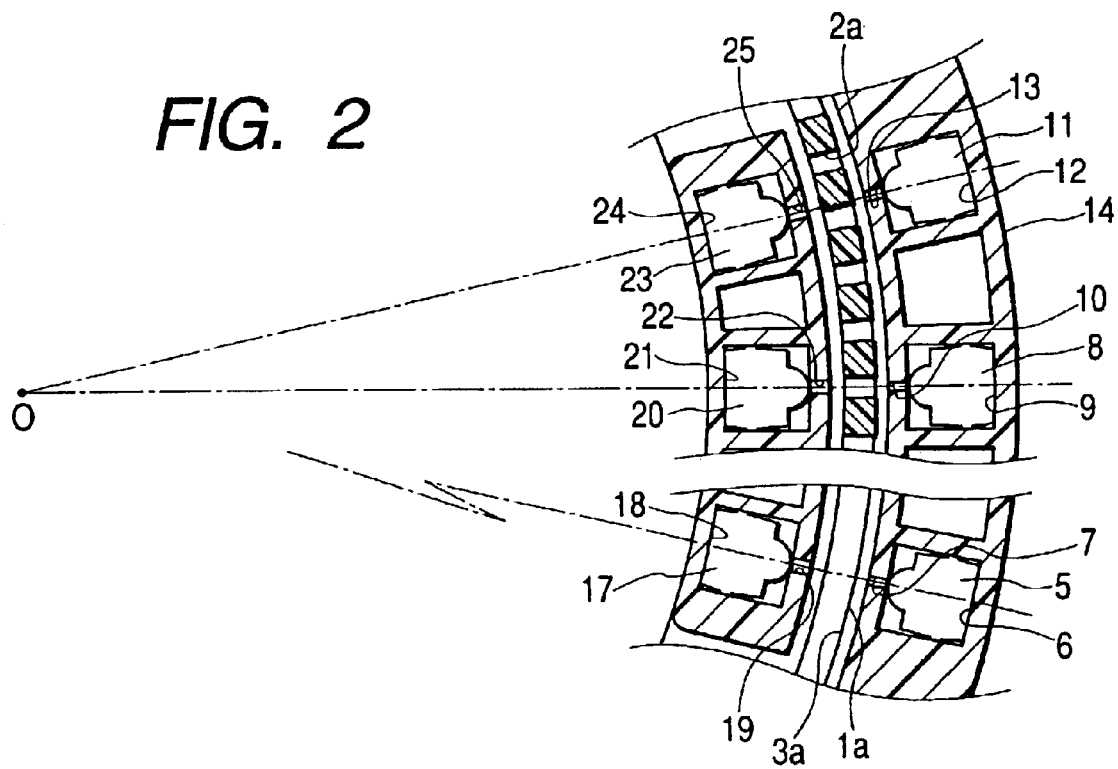
FIG. 2 is a horizontal sectional view of first to third detecting means that are provided in the rotation angle detecting device of FIG. 1.
Figure 3A:
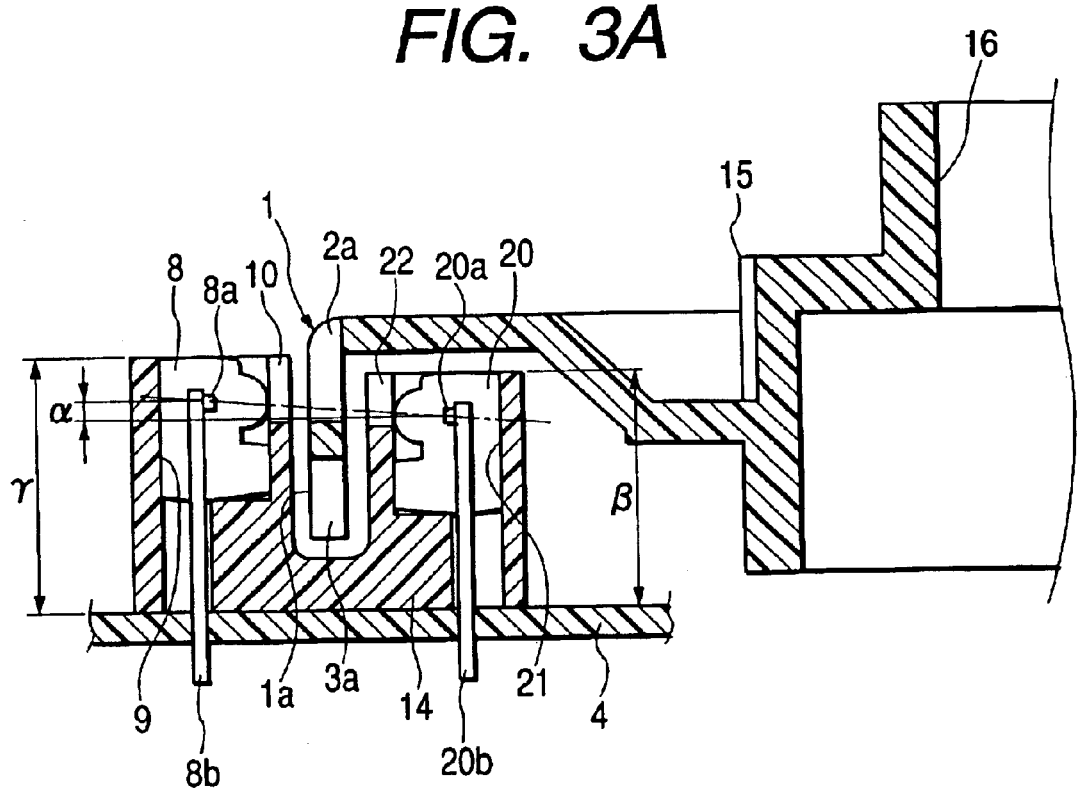
FIGS. 3A and 3B are vertical sectional views showing important parts of the rotation angle detecting device of FIG. 1.
Figure 3B:
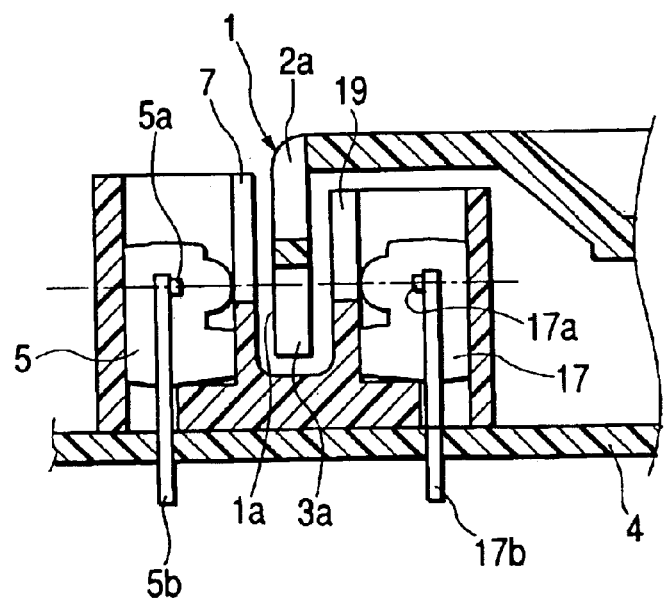

FIG. 1 is a perspective view of the rotation angle detecting device according to the embodiment. FIG. 2 is a horizontal sectional view of first to third detecting means that are provided in the rotation angle detecting device of FIG. 1. FIGS. 3A and 3B are vertical sectional views showing important parts of the rotation angle detecting device of FIG. 1.

The rotation angle detecting device, which serves for detection of a steering angle of a vehicle steering wheel, is provided with a cylindrical code plate 1 that is attached to a rotary body (not shown) of a vehicular apparatus and generates signals as it rotates together with the rotary body (see FIGS. 1 and 2), and detecting means for detecting the signals that are generated by the rotation of the code plate 1.

As shown in FIG. 1, the code plate 1 has a cylindrical synthetic resin body that is integral with a rotary body that is a gear portion 15, for example. For example, a circumferential side portion 1a of the cylindrical body is provided with a first slit array 2 as an incremental signal track and a second slit array 3 as an index signal track.

The first slit array 2 is provided in the circumferential side portion 1a of the cylindrical code plate 1. First slits 2a for setting ranges that allow passage of light and ranges that do not are arranged in the circumferential direction of the code plate 1. The second slit array 3 consists of second slits 3a that are provided in the circumferential side portion 1a of the cylindrical code plate 1 so as to be arranged in the circumferential direction of the code plate 1. The first slit array 2 and the second slit array 3 are arranged along the rotation axis of the code plate 1.

The first slits 2a are cuts that are formed at one end of the circumferential side portion 1a of the cylindrical code plate 1 so as to extend along the rotation axis of the code plate 1. The second slits 3a are cuts that are formed at the other end of the circumferential side portion 1a of the cylindrical code plate 1 so as to extend along the rotation axis of the code plate 1.

Two detecting means, that is, first and second detecting means, are provided for the first slit array 2.

As shown in FIG. 2, the first detecting means has a light-emitting element 20 as a light-emitting portion that is disposed at a prescribed position and emits light toward a first slit 2a and a light-receiving element 8 as a light-receiving portion for receiving light that has been emitted by the light-emitting element 20 and has passed through a first slit 2a.

As shown in FIG. 3A, the light-emitting element 20 incorporates a light-emitting chip 20a as a light source. The light-emitting chip 20a emits light being supplied with power from a terminal 20b. The light-receiving element 8 incorporates a light-receiving chip 8a for receiving light. A terminal 8b for sending out a signal to the effect that light has been received is connected to the light-receiving chip 8a.

As shown in FIGS. 1 and 2, the light-emitting element 20 and the light-receiving element 8 are attached to an attachment stage 14 having portions between which part of the circumferential side portion 1a of the code plate 1 is interposed.

More specifically, the attachment stage 14 is provided on a substrate 4 and has a U-shaped vertical cross-section so that part of the circumferential side portion 1a is located between the light-emitting element 20 and the light-receiving element 8. A portion of the attachment stage 14 inside the circumferential side portion 1a is provided with a housing portion 21 that houses the light-emitting element 20 and an emission light guiding portion 22 that is formed by cutting a circumferential-side-portion-1a-side wall of the housing portion 21 along the rotation axis of the code plate 1 and guides light that is emitted by the light-emitting element 20 to the light-receiving element 8. A portion of the attachment stage 14 outside the circumferential side portion 1a is provided with a housing portion 9 that houses the light-receiving element 8 and a reception light guiding portion 10 that is formed by cutting a circumferential-side-portion-1a-side wall of the housing portion 9 along the rotation axis of the code plate 1 and guides light that has passed through a slit 2a to the light-receiving element 8.

As shown in FIGS. 2 and 3A, the second detecting means is provided adjacent to the first detecting means in the circumferential direction of the code plate 1. The second detecting means is configured in the same manner as the first detecting means. That is, the second detecting means has a light-emitting element 23 as a light-emitting portion for emitting light toward a slit 2a and a light-receiving element 11 as a light-receiving portion for receiving light that has been emitted by the light-emitting element 23 and has passed through a slit 2a.

Like the light-emitting element 20, the light-emitting element 23 has a light-emitting chip and a terminal for supplying power to the chip (both not shown). Like the light-receiving element 8, the light-receiving element 11 has a light-receiving chip and a terminal for sending out a signal to the effect that the light-receiving chip has received light.

As shown in FIG. 2, the light-emitting element 23 and the light-receiving element 11 are attached to the attachment stage 14.

More specifically, as in the case of the first detecting means, the attachment stage 14 is provided with a housing portion 24 that is located inside the circumferential side portion 1a and houses the light-emitting element 23, an emission light guiding portion 25 that is formed by cutting a circumferential-side-portion-1a-side wall of the housing portion 24 and guides light that is emitted by the light-emitting element 23 to the light-receiving element 8, a housing portion 12 that is located outside the circumferential side portion 1a and houses the light-receiving element 11, and a reception light guiding portion 13 that is formed by cutting a circumferential-side-portion-1a-side wall of the housing portion 12 along the rotation axis of the code plate 1 and guides light that has passed through a slit 2a to the light-receiving element 11.

The positions of the first detecting means and the second detecting means that are provided in the above-described manner are set so as to cause a phase difference between a signal detected by the first detecting means and a signal detected by the second detecting means. For example, setting is made so that when the center of a first slit 2a passes by the center of the light-emitting chip 20a of the first detecting means, one edge of another first slit 2a passes by the center of the light-emitting chip of the second detecting means.

A third detecting means is provided for the second slit array 3. As shown in FIGS. 2 and 3B, the third detecting means is provided adjacent to the first detecting means in the circumferential direction of the code plate 1 at a position lower than the first detecting means so as to correspond to the second slit array 3. The third detecting means has a light-emitting element 17 as a light-emitting portion for emitting light toward a second slit 3a and a light-receiving element 5 as a light-receiving portion for receiving light that has been emitted by the light-emitting element 17 and has passed through a second slit 3a.

Like the light-emitting element 20, the light-emitting element 17 has a light-emitting chip 17a as a light source and a terminal 17b for supplying power to the light-emitting chip 17a. Like the light-receiving element 8, the light-receiving element 5 has a light-receiving chip 5a for receiving light and a terminal 5b for sending out a signal to the effect that the light-receiving chip 5a has received light.

As shown in FIG. 2, as in the cases of the first and second detecting means, the light-emitting element 17 and the light-receiving element 5 are attached to the attachment stage 14.

More specifically, the attachment stage 14 is provided with a housing portion 18 that is located inside the circumferential side portion 1a and houses the light-emitting element 17, an emission light guiding portion 19 that is formed in a circumferential-side-portion-1a-side wall of the housing portion 18 and guides light that is emitted by the light-emitting element 17 to the light-receiving element 5, a housing portion 6 that is located outside the circumferential side portion 1a and houses the light-receiving element 5, and a reception light guiding portion 7 that is formed by cutting a circumferential-side-portion-1a-side wall of the housing portion 6 and guides light that has passed through a second slit 3a to the light-receiving element 5.

In this embodiment, the first and second detecting means are set in the following manner. Since the first and second detecting means are set in the same manner, a description will made of the first detecting means.

In the first detecting means, the light-emitting element 20 and the light-receiving element 8 are provided in such a manner that part of the circumferential side portion 1a is interposed in between (described above), and that, as shown in FIG. 3A, the light-receiving element 8 receives light that is emitted by the light-emitting element 20 and travels somewhat upward with respect to the horizontal direction in a state that the top planar portion of the cylindrical code plate 1 is oriented horizontally.

That is, the positions of the light-emitting element 20 and the light-receiving element 8 are set identical when measured along the circumference of the code plate 1, and a dimension $\beta$ of the light-emitting element 20 which is located inside the code plate 1 is set smaller than a dimension $\gamma$ of the light-receiving element 8 which is located outside the code plate 1 (the dimensions $\beta$ and $\gamma$ are measured along the rotation axis of the code plate 1).

With the above settings, the position of the light-emitting chip 20a is lower than the position of the light-receiving chip 8a by a dimension $\alpha$. However, since the first slits 2a are cuts that are formed at an end of the circumferential side portion 1a of the cylindrical code plate 1 so as to extend along the rotation axis of the code plate 1, light that is emitted by the light-emitting chip 20a and travels somewhat upward with respect to the horizontal direction is not interrupted between light-emitting chip 20a and the light-receiving chip 8a when a first slit 2a passes by the first detecting means.

In the above-configured rotation angle detecting device according to the embodiment, when the code plate 1 is rotated together with the gear portion 15, the first slit array 2 is also rotated and light that is emitted by the light-emitting element 20 passes through and does not pass through a first slit 2a alternately, whereby a signal is generated according to the rotation of the code plate 1. This signal is detected depending on whether the light-detecting element 8 detects light. The second detecting means detects a signal in the same manner as the first detecting means does. As a result, a rotation angle, a rotation direction, and a rotation speed of the gear portion 15 can be detected.

The second slit array 3 is also rotated. Therefore, light is received by the light-receiving element 5 of the third detecting means every rotation of the gear portion 15, whereby the number of rotations, for example, of the gear portion 15 can be detected.

As described above, according to the embodiment, a rotation angle, a rotation direction, and a rotation speed of the gear portion 15 can be detected based on signals that are generated by the first slit array 2 and the number of rotations of the gear portion 15 can be detected based on a signal that is generated by the second slit array 3. Therefore, for example, this rotation angle detecting device can be used for controlling a rotary body that is provided in a vehicular apparatus.

In particular, in the embodiment, the first slit array 2 and the second slit array 3 are formed in the circumferential side portion 1a of the cylindrical code plate 1, whereby the dimension of the portion where the first slit array 2 and the second slit array 3 are formed can be included in the dimension of the code plate 1 along its rotation axis rather than the diameter of the code plate 1. Therefore, high resolution can be attained without increasing the diameter of the code plate 1. As a result, the dimension of the rotation angle detecting device in the radial direction of the code plate 1 can be set smaller than in a conventional rotation angle detecting device that is provided with a disk-shaped code plate and has the same resolution.

In particular, in the embodiment, in the first detecting means and the second detecting means, the light-emitting element 20 or 23 and the light-receiving element 8 or 11 are disposed so that part of the circumferential side portion 1a is interposed in between. And the positions of the light-emitting element 20 or 23 and the light-receiving element 8 or 11 are set identical when measured along the circumference of the code plate 1, and the dimension β of the light-emitting element 20 or 23 which is located inside the circumferential side portion 1a of the code plate 1 is set smaller than the dimension γ of the light-receiving element 8 or 11 which is located outside the circumferential side portion 1a (the dimensions β and γ are measured along the rotation axis of the code plate 1). Therefore, the dimension of the cylindrical code plate 1 in its rotation axis direction can be made smaller and hence the dimension of the rotation angle detecting device in the rotation axis direction of the code plate 1 can be made smaller.

In particular, in this embodiment, the first slits 2a are cuts that are formed at one end of the circumferential side portion 1a of the cylindrical code plate 1 so as to extend along the rotation axis of the code plate 1. The second slits 3a are cuts that are formed at the other end of the circumferential side portion 1a of the cylindrical code plate 1 so as to extend along the rotation axis of the code plate 1. Therefore, when the code plate 1 is formed by resin molding using a molding die, the cylindrical code plate 1 having the two kinds of slit arrays can be formed without the need for using a slide core for forming slits. The structure of the molding die is simple and the number of manufacturing steps is smaller. As a result, the manufacturing cost of the rotation angle detecting device can be reduced.

As described above, a rotation angle detecting device according to the invention comprises a cylindrical code plate that rotates as a rotary body rotates, the code plate having a circumferential side portion that is provided with a plurality of slit arrays that are arranged along a rotation axis of the code plate, each of the slit arrays having slits that are arranged in a circumferential direction of the code plate; a light-emitting portion provided at a prescribed position for each of the slit arrays, for emitting light toward a slit of the slit array; and a light-receiving portion provided for each of the slit arrays, for receiving the light that has been emitted by the light-emitting portion and has passed through the slit. With this configuration, high resolution can be attained without increasing the diameter of the code plate. As a result, the dimension of the rotation angle detecting device in the radial direction of the code plate can be set smaller than in a conventional rotation angle detecting device having the same resolution.

What is claimed is:

1. A rotation angle detecting device comprising:
   a cylindrical code plate that rotates as a rotary body rotates, the code plate having a circumferential side portion that is provided with two slit arrays that are arranged along a rotation axis of the code plate, each of the slit arrays having slits that are arranged in a circumferential direction of the code plate;
   a light-emitting portion provided at a prescribed position for each of the slit arrays, for emitting light toward a slit of the slit array; and
   a light-receiving portion provided for each of the slit arrays, for receiving the light that has been emitted by the light-emitting portion and has passed through the slit,
   wherein the slits of one of the two slit arrays are cuts that are formed at one end of the circumferential side portion so as to extend along the rotation axis of the code plate, and the slits of the other slit array are cuts that are formed at the other end of the circumferential side portion so as to extend along the rotation axis of the code plate.

2. The rotation angle detecting device according to claim 1, wherein one of the two slit arrays is an incremental signal track and the other slit array is an index signal track.

3. The rotation angle detecting device of claim 2, wherein the slits of the incremental signal track are smaller in the rotation direction than the slits of the index signal track.

4. The rotation angle detecting device of claim 3, wherein a greater number of incremental signal track slits are present than index signal track slits.

5. The rotation angle detecting device of claim 2, further comprising an attachment stage to which the light-emitting portions and the light-receiving portions are attached and which is parallel to a top planar portion of the cylindrical code plate.

6. The rotation angle detecting device according to claim 1, wherein the cylindrical code plate further has a top planar portion, and wherein the cuts of the incremental signal track bridge the top planar portion and the circumferential side portion and the cuts of the index signal track are adjacent to an opening of the circumferential side portion.

7. The rotation angle detecting device of claim 6, further comprising an attachment stage to which the light-emitting portions and the light-receiving portions are attached and which is parallel to the top planar portion of the cylindrical code plate.

8. The rotation angle detecting device according to claim 1, wherein at least one of the light-emitting portions is disposed inside the cylindrical code plate and at least one of the light-receiving portions is disposed outside the cylindrical code plate, wherein the at least one light-receiving portion receives light that is emitted by the at least one light-emitting portion and travels somewhat upward with respect to a horizontal direction in a state that a top planar portion of the cylindrical code plate is oriented horizontally, and the light-emitting portions and the light-receiving portions are arranged at one of the two slit arrays which is adjacent to the top planar portion of the cylindrical code plate.

9. The rotation angle detecting device according to claim 8, wherein one of the two slit arrays is an incremental signal track and the other slit array is an index signal track.

10. The rotation angle detecting device according to claim 9, wherein cuts as the slits of the incremental signal track bridge the top planar portion and the circumferential side portion and cuts as the slits of the index signal track are adjacent to an opening of the circumferential side portion.

11. The rotation angle detecting device of claim 10, wherein the light-emitting portions and the light-receiving portions are arranged such that light emitted from the light-emitting portions travels in the horizontal direction, passes through the other of the two slit arrays, and is received by the light-receiving portions.

12. The rotation angle detecting device of claim 10, further comprising an attachment stage to which the light-emitting portions and the light-receiving portions are attached and which is parallel to the top planar portion of the cylindrical code plate.

13. The rotation angle detecting device of claim 9, wherein the slits of the incremental signal track are smaller in the rotation direction than the slits of the index signal track.

14. The rotation angle detecting device of claim 13, wherein a greater number of incremental signal track slits are present than index signal track slits.

15. The rotation angle detecting device of claim 9, wherein the light-emitting portions and the light-receiving portions are arranged such that light emitted from the light-emitting portions travels in the horizontal direction, passes through the other of the two slit arrays, and is received by the light-receiving portions.

16. The rotation angle detecting device of claim 9, further comprising an attachment stage to which the light-emitting portions and the light-receiving portions are attached and which is parallel to the top planar portion of the cylindrical code plate.

17. The rotation angle detecting device of claim 8, wherein the light-emitting portions and the light-receiving portions are arranged such that light emitted from the light-emitting portions travels in the horizontal direction, passes through the other of the two slit arrays, and is received by the light-receiving portions.

18. The rotation angle detecting device of claim 8, further comprising an attachment stage to which the light-emitting portions and the light-receiving portions are attached and which is parallel to the top planar portion of the cylindrical code plate.

19. The rotation angle detecting device of claim 1, further comprising an attachment stage to which the light-emitting portions and the light-receiving portions are attached and which is parallel to a top planar portion of the cylindrical code plate.

* * * * *